(12) United States Patent
Tournour et al.

(10) Patent No.: US 7,566,471 B2
(45) Date of Patent: Jul. 28, 2009

(54) METHOD OF PROCESSING FOOD PATTIES

(75) Inventors: Robert Tournour, Plymouth, WI (US); Richard A. Payne, Plymouth, WI (US)

(73) Assignee: Tomahawk Manufacturing, Sheboygan, WI (US)

( * ) Notice: Subject to any disclaimer, the term of this patent is extended or adjusted under 35 U.S.C. 154(b) by 452 days.

(21) Appl. No.: 11/329,325

(22) Filed: Jan. 10, 2006

(65) Prior Publication Data
US 2006/0110510 A1   May 25, 2006

Related U.S. Application Data

(62) Division of application No. 10/287,028, filed on Nov. 4, 2002, now Pat. No. 7,014,456.

(51) Int. Cl.
  *B29C 45/34* (2006.01)
(52) U.S. Cl. ...................................... 426/513
(58) Field of Classification Search ............... 426/513
  See application file for complete search history.

(56) References Cited

U.S. PATENT DOCUMENTS

| | | | |
|---|---|---|---|
| 3,765,056 A * | 10/1973 | Holly .................... | 425/556 |
| 4,054,967 A | 10/1977 | Sandberg et al. | |
| 4,097,961 A | 7/1978 | Richards | |
| 4,418,446 A * | 12/1983 | Sandberg et al. .......... | 425/574 |
| 4,872,241 A | 10/1989 | Lindee | |
| 5,037,350 A | 8/1991 | Richardson et al. | |
| 5,795,610 A | 8/1998 | London | |
| 6,416,314 B1 | 7/2002 | LaBruno | |
| 6,517,340 B2 | 2/2003 | Sandberg | |
| 6,540,503 B1 | 4/2003 | Kugelmann | |
| 6,604,935 B2 | 8/2003 | Tournour et al. | |
| 6,713,111 B1 | 3/2004 | Tournour et al. | |
| 6,827,111 B1 * | 12/2004 | Tournour et al. .......... | 141/12 |
| 2002/0182297 A1 | 12/2002 | Buhlke et al. | |
| 2003/0152663 A1 | 8/2003 | Sandberg | |
| 2005/0013895 A1 | 1/2005 | Azzar | |

* cited by examiner

*Primary Examiner*—Robert B Davis
(74) *Attorney, Agent, or Firm*—Philip M. Weiss; Weiss & Weiss

(57) ABSTRACT

A machine for processing individual food items comprises a mold plate having multiple longitudinally spaced transverse rows of cavities. The mold plate slides such that the rows of cavities sequentially communicate with a fill slot in a fill plate. Bulk food material fills the cavities and displaces air from them into a breather plate. The breather plate has one or more longitudinal grooves in a working surface. The fill plate has one or more longitudinal grooves in a working surface that communicate with the atmosphere. One or more vent holes in the mold plate communicate with the breather plate and fill plate grooves for all positions of the mold plate at which food material is filling a row of cavities. No air is trapped in the breather plate, and there is no buildup of air pressure that could create a friction force between the mold plate and the fill plate.

12 Claims, 8 Drawing Sheets

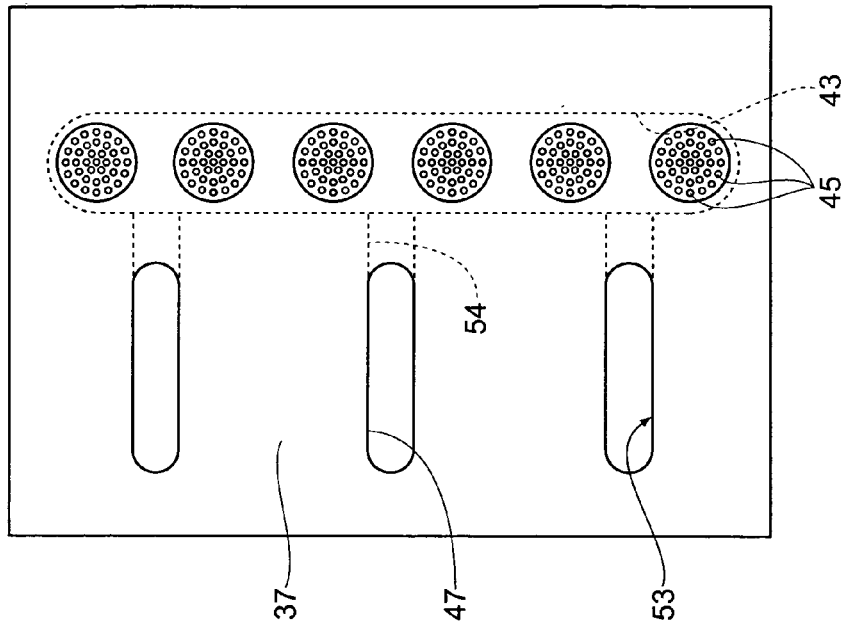
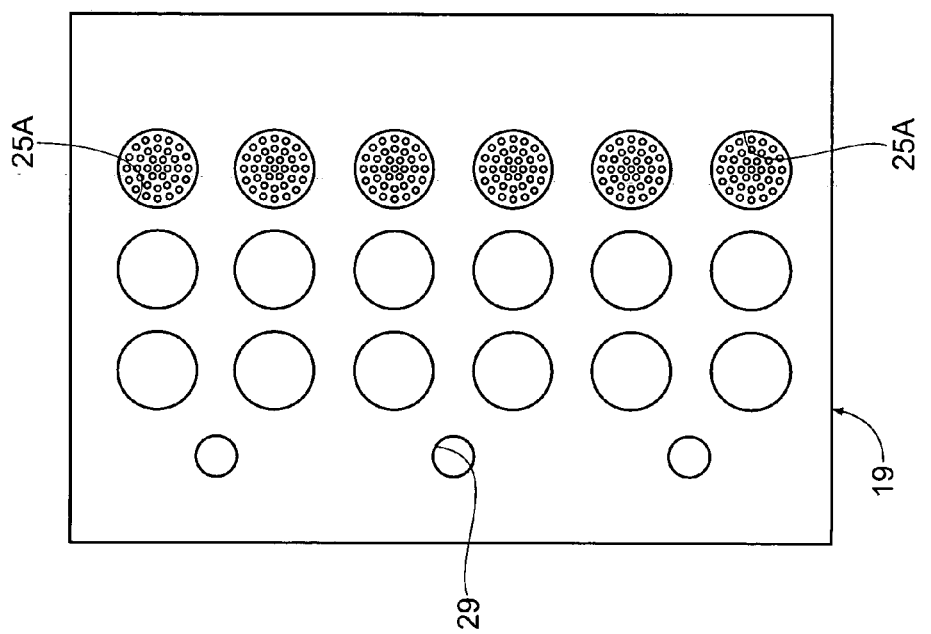

METHOD OF PROCESSING FOOD PATTIES

RELATED APPLICATION

This application is a divisional of U.S. application Ser. No. 10/287,028, filed 4 Nov. 2002 now U.S. Pat. No. 7,014,456.

BACKGROUND OF THE INVENTION

1. Field of the Invention

This invention pertains to processing bulk food material, and more particularly to apparatus that operates with minimal vibrations to form individual food items to form bulk food material.

2. Description of the Prior Art

Various equipment has been developed to produce individual items of food products from a bulk supply. For example, machines that produce individual patties of ground meat are well known and in widespread use. Similar machines are used to produce nuggets of whole muscle meat. U.S. Pat. Nos. 4,054,967 and 4,097,961 show typical prior machines that form patties from ground meat. U.S. Pat. No. 4,872,241 describes a prior machine for making nuggets from whole muscle meat.

Briefly by way of explanation, a supply of bulk food material is forced under pressure from a hopper through one or more fill slots in a fill plate into individual cavities in a mold plate at a fill position. On the opposite side of the mold plate as the fill plate is a breather plate. Air and some juices flow through small holes and into a channel in the breather plate as the mold plate cavities are filled. The breather plate channel communicates with a vent hole through the mold plate. In turn, the mold plate vent hole communicates with an opening in the fill plate. A duct connects the fill plate opening with the food hopper.

After the mold plate cavities have been filled, the pressure on the bulk food product is reduced. The mold plate slides longitudinally in a forward stroke such that the cavities lose communication with the fill plate fill slots. The mold plate slides to an eject position where the food material is ejected from the cavities in the form of individual patties. The mold plate then slides back to the fill position, and the cycle repeats.

At the start of the mold plate forward stroke, food product continues to fill the cavities. Accordingly, some air continues to be displaced from the cavities to the breather plate. In machines with a mold plate having only one transverse row of cavities, there is an uninterrupted communication between the breather plate and the atmosphere as long as the cavities are in communication with the fill plate fill slots.

A problem arises with mold plates having a second row of cavities. When the mold plate slides in the forward stroke, the second row of cavities comes into communication with the fill plate fill slots and are filled while the mold plate is moving. However, by the time the second row of cavities has reached the fill slot, the mold plate vent hole has lost communication with the breather plate and fill plate grooves. Consequently, the air and juices displaced from the cavities become trapped in the breather plate. The pressure of the trapped air forces the mold plate against the fill plate, causing frictional resistance to mold plate sliding. The result is detrimental vibrations and chatter of the machine. The friction problem is especially acute on machines that have more than two longitudinally spaced rows of cavities.

Thus, a need exists for eliminating the lateral force on the mold plate during reciprocation.

SUMMARY OF THE INVENTION

In accordance with the present invention, a vent system for a food processing machine is provided that greatly reduces the friction force on a reciprocating mold plate. This is accomplished by apparatus that has uninterrupted communication between a breather plate and the atmosphere at all times that cavities in the mold plate are being filled with food product.

The mold plate reciprocates in longitudinal directions between a fill position and an eject position. The mold plate cavities are arranged in longitudinally spaced transverse rows. One or more vent holes in the mold plate are part of the vent system of the invention.

A fill plate has one or more fill slots that direct food product from a storage hopper to the mold plate cavities. The fill plate has a working surface that is in sliding contact with the mold plate, and an opposed second surface. The fill plate working surface has at least one longitudinal groove that communicates with the mold plate vent hole. The fill plate groove communicates with the atmosphere. According to one aspect of the invention, the fill plate groove opens into the second surface, and a duct communicates between the second surface opening and the storage hopper.

The breather plate has a working surface that is in sliding contact with the mold plate, and an opposed second surface. Patterns of small holes in the working surface are in alignment with the front row of mold plate cavities when the mold plate is in its fill position. There is at least one longitudinal groove in the breather plate second surface. The breather plate groove communicates with the patterns of small holes and with the vent hole in the mold plate.

When the mold plate is at the fill position, food product is forced through the fill slot in the fill plate into the front row of mold plate cavities. Air and some food product are displaced by the incoming food material through the small holes in the breather plate into the vent system of the invention. There is thus no buildup of pressure in the breather plate grooves while the mold plate cavities are being filled.

It is a feature of the invention that the breather plate and fill plate grooves are long enough such that the breather plate patterns of small holes communicate with the atmosphere for all positions of the mold plate while food product is entering the cavities of all the rows. As the mold plate slides in the forward stroke, the rows of cavities subsequent to the first row are filled as they pass the fill plate fill slot. Air and food product from the additional cavity rows are displaced through the breather plate small holes and to the vent system in the same manner as with the front row of cavities, and the operation of the vent system is the same for the additional rows. Consequently, there is no pressure buildup in the vent system during mold plate reciprocation. The result is no friction force between the mold plate and the fill plate due to trapped air pressure in the breather plate.

The vent system may be composed of a single mold plate vent hole, breather plate groove, and fill plate groove. In that case, all the patterns of small breather plate holes lead to the breather plate groove. Alternately, there may be a separate groove for each of the patterns of small holes in the breather plate. In that case, each breather plate groove communicates with a corresponding mold plate vent hole and fill plate groove. According to another aspect of the invention, groups of breather plate patterns of small holes connect with shared grooves that communicate with corresponding mold plate vent holes and fill plate grooves.

The method and apparatus of the invention, using a vent system that always communicates with the atmosphere when the mold plate cavities are being filled, thus assures quiet and vibration-free reciprocation of the mold plate. Air and food product displaced into breather plate do not build up any pressure on the mold plate, even though the mold plate has more than one row of cavities.

Other advantages, benefits, and features of the invention will become apparent to persons skilled in the art upon reading the detailed description of the invention and studying the drawings.

BRIEF DESCRIPTION OF THE DRAWINGS

FIG. 2 is a view taken along line 2-2 of FIG. 1.

FIG. 3 is a view taken along line 3-3 of FIG. 1.

DETAILED DESCRIPTION OF THE INVENTION

Figure 1:
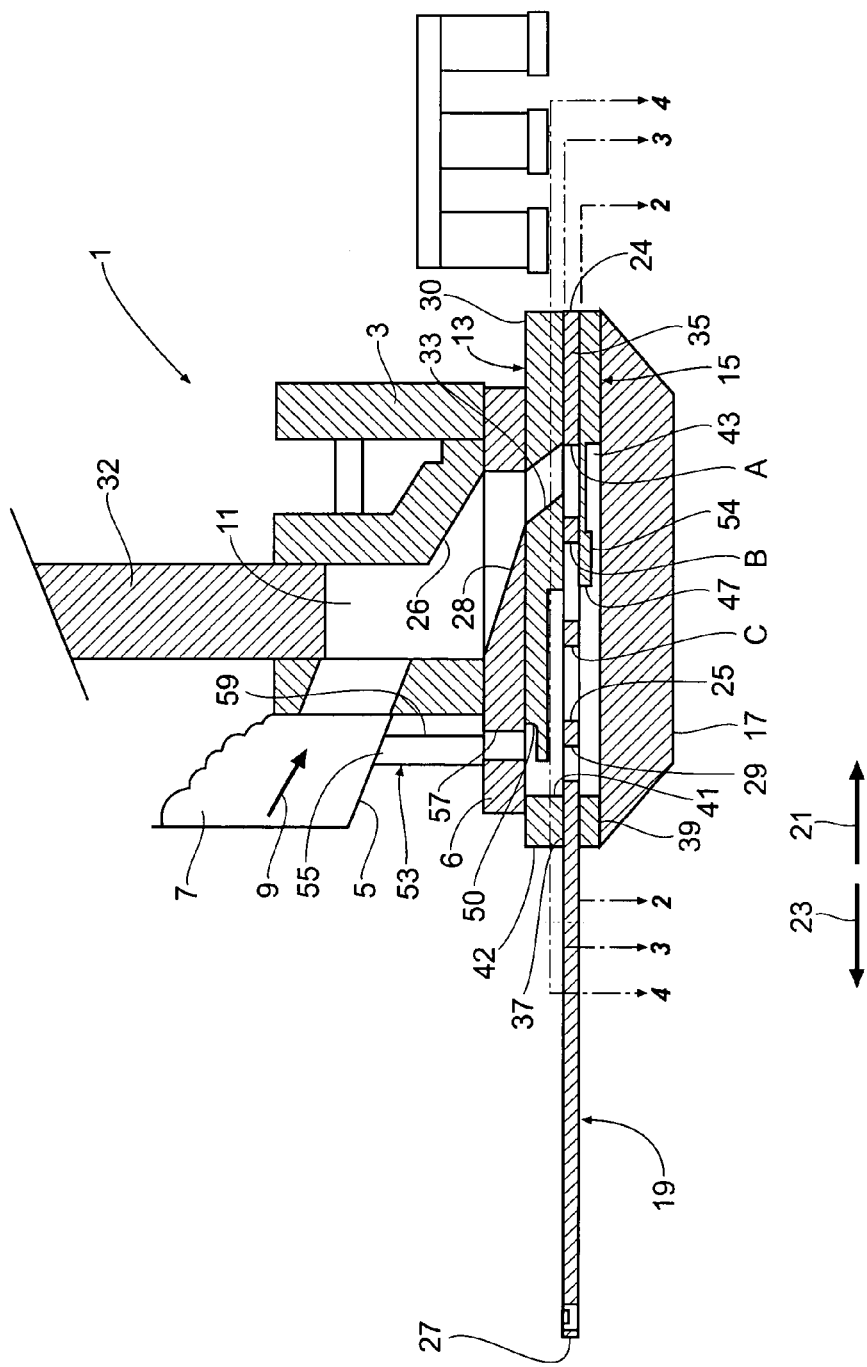
FIG. 1 is a simplified cross-sectional view of a portion of a typical food processing machine with a vent system according to the present invention and shown at the beginning of a cycle.
Figure 4:
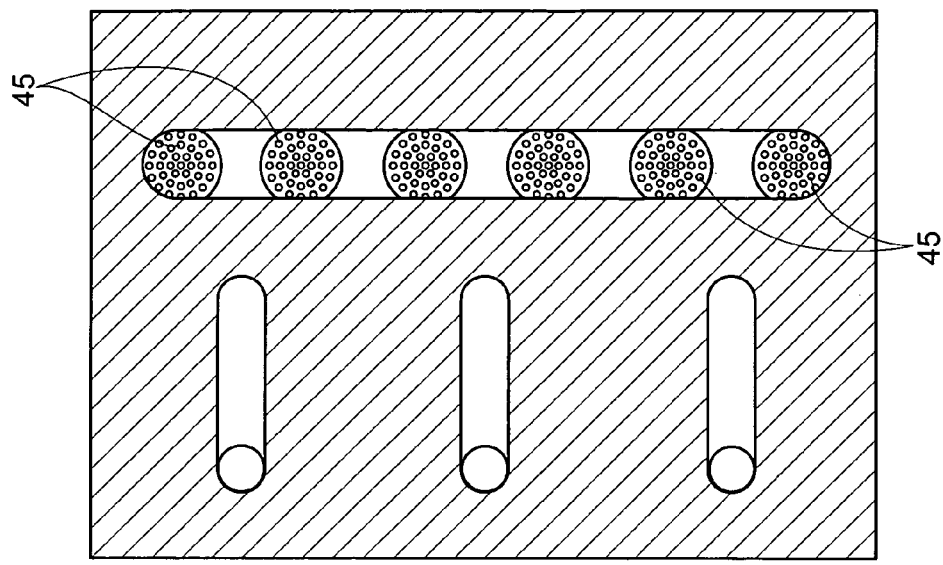
FIG. 4 is a cross-sectional view taken along line 4-4 of FIG. 1.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1-4, a machine 1 for processing food products is illustrated that includes the present invention. The machine 1 may be constructed generally along the lines of the machine described in U.S. Pat. No. 4,054,967.

For the purposes of the present invention, the important components of the machine 1 include a sturdy frame 3 with a hopper 5 and a top plate 6. The hopper 5 holds a large quantity of bulk food product 7, such as ground meat or whole muscle meat. Augers, not shown, in the hopper rotate to urge the food product 7 in the direction of arrow 9 to a pump box 11. In the pump box 11 is a plunger 32. The bottom of the pump box has a passage 26. The pump box passage 26 leads into another passage 28 in the top plate 6.

Beneath the top plate 6 and attached to it is a fill plate 13. A breather plate 15 is parallel to and spaced from the fill plate 13. A mold plate 19 reciprocates longitudinally in the directions of arrows 21 and 23 between the fill plate and the breather plate 15.

Figure 8:
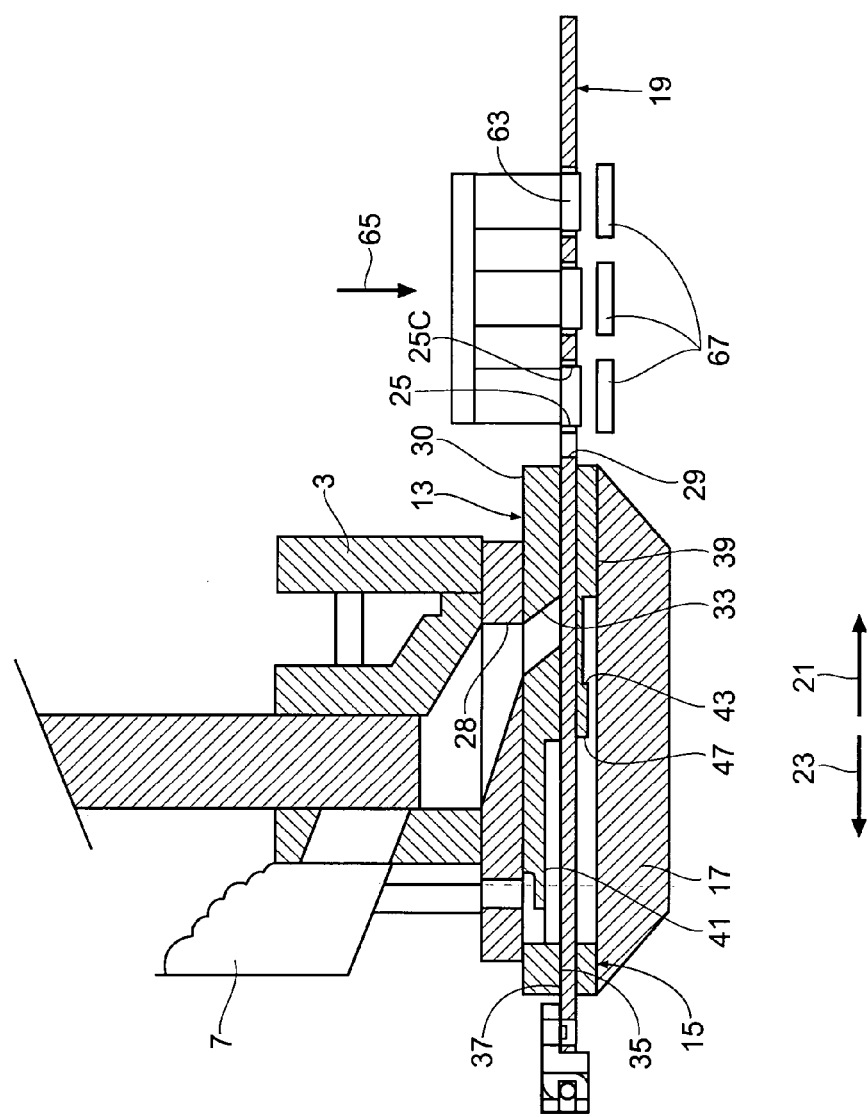
FIG. 8 is a view showing completed food items being ejected from the mold plate.

The mold plate 19 has a leading edge 24 and a trailing edge 27. The mold plate also has a number of cavities 25 through it. As depicted, the mold plate has three longitudinally spaced rows A, B, and C of cavities 25, and there are six cavities in each row. That is, the particular mold plate shown has three rows A, B, and C and six columns of cavities. However, it will be understood that the invention is not limited to any particular number of rows or columns of cavities. There is one or more vent holes 29 between the trailing row C of cavities and the mold plate trailing edge 27. The mold plate 19 reciprocates between a fill position as shown in FIG. 1 and an eject position as shown in FIG. 8.

The fill plate 13 has a top surface 30 adjacent the top plate 6 and an opposite working surface 35 adjacent the mold plate 19. The fill plate is depicted as having one transverse fill slot 33 between the surfaces 30 and 35. If desired, there may be several shorter fill slots, such as one for each mold plate cavity 25, rather than one long fill slot 33. The top plate passage 28 leads into the fill plate fill slot.

The breather plate 15 is mounted to a mold cover 17 of the frame 3. The breather plate has a working surface 37 and an opposed surface 39 that is adjacent the mold cover 17. In the illustrated construction, there is a transverse channel 43 in the breather plate surface 39 generally opposite the fill slot 33 in the fill plate 13. There are a number of patterns of small holes 45 between the breather plate working surface 37 and the channel 43. The patterns of small holes 45 are aligned with the respective mold plate cavities 25A when the mold plate is at the fill position.

In operation, when the mold plate 19 is in the fill position, the plunger 32 forces the food product 7 through the pump box passage 26, through the top plate passage 28, and into the fill plate fill slot 33. The food product flows through the fill slot and into the mold plate cavities 25 in the front row A. The incoming food product displaces the air in the mold plate cavities to pass through the breather plate holes 45 and into the channel 43.

In accordance with the present invention, the food processing machine 1 includes a vent system 53 that prevents buildup of pressure from the air displaced from the mold plate cavities 25 at all times that the cavities are being filled from the fill plate 13. The vent system 53 is comprised of one or more longitudinal grooves 47 in the breather plate 15. The breather plate grooves 47 are in the working surface 35, and they connect to the channel 43 by associated slots 54. As illustrated, there are three grooves 47, but more or fewer may be used if desired.

Figure 5:
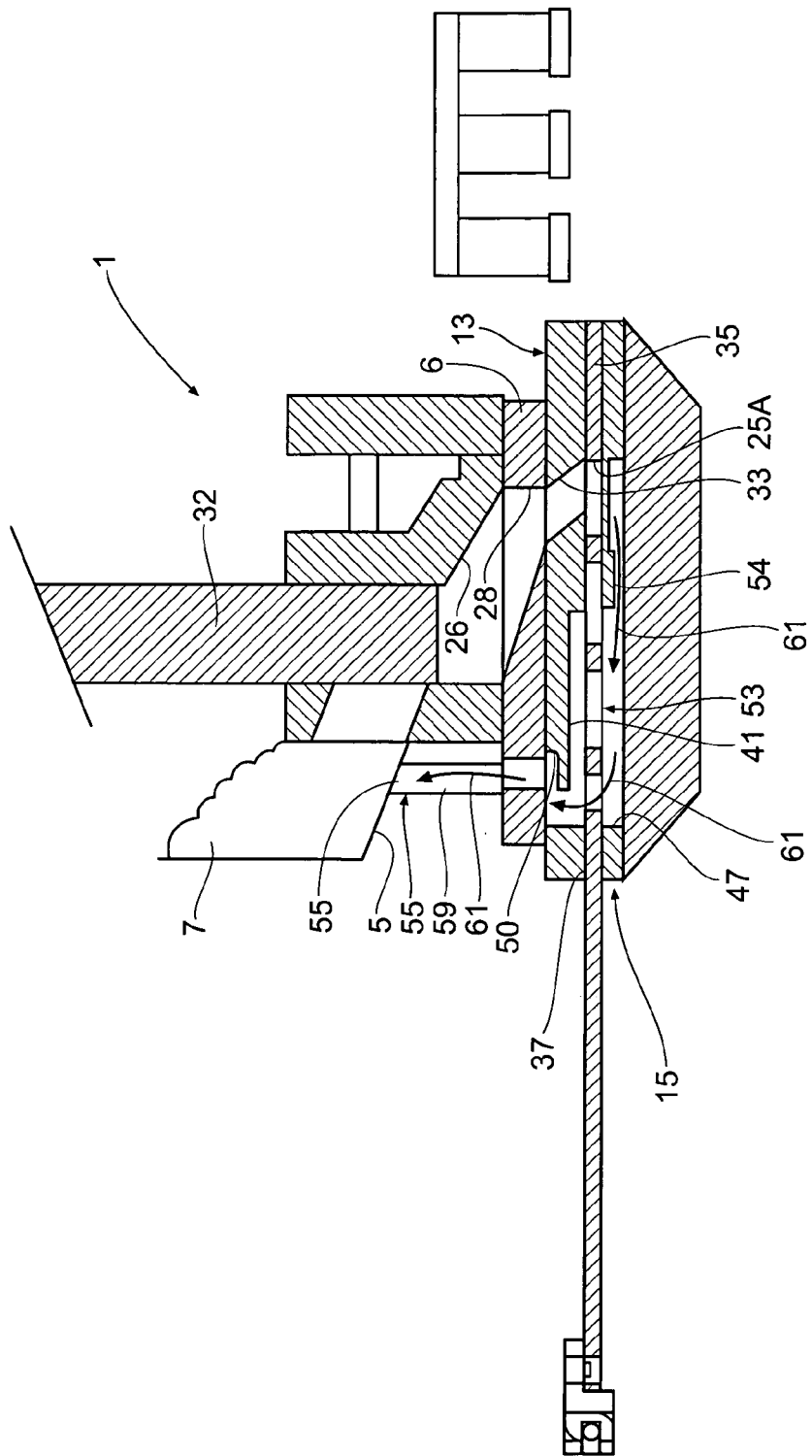
FIG. 5 is a view similar to FIG. 1, but showing the machine during initial filling of the mold plate cavities.

The vent system 53 further comprises longitudinal grooves 41 in the fill plate working surface 35. The fill plate grooves 41 are preferably aligned with respective grooves 47 in the breather plate 15. The fill plate also has an opening 50 from each groove 41 to the top plate 6. A duct 55 communicates from the fill plate openings 50 to the atmosphere. The duct 55 may be composed of a number of tubes 59 each aligned with an opening 50 in the fill plate. Alternately, the duct may be a lateral slot aligned with all the fill plate openings. The tubes 59 or slot lead to the machine hopper 5, which is open to the atmosphere. Accordingly, air displaced out of the mold plate cavities 25 is free to flow in the direction of arrows 61 without pressure buildup in the vent system 53 as the food product 7 fills the cavities, FIG. 5.

Figure 6:
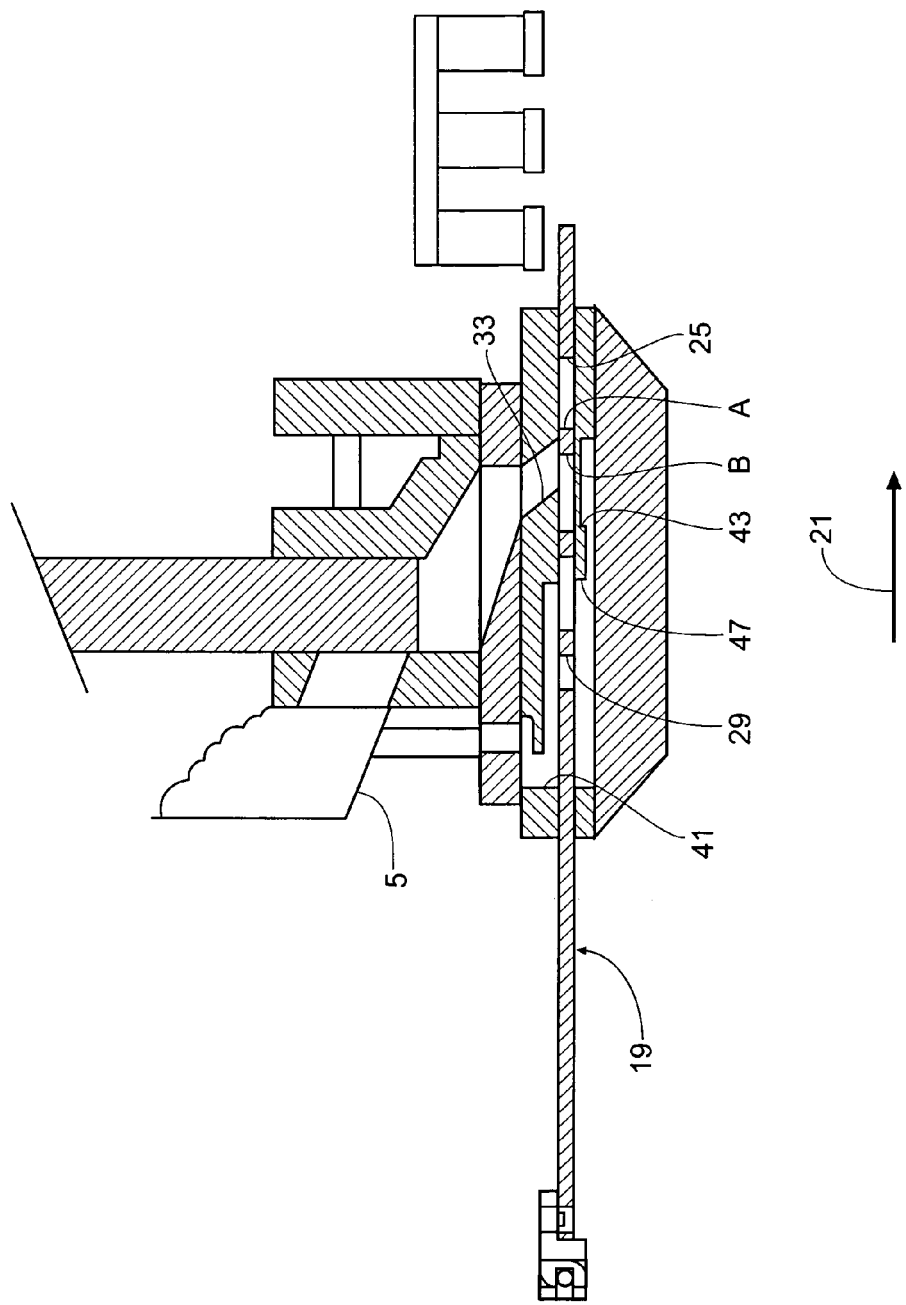
FIG. 6 is a view similar to FIG. 5, but showing the machine during continued filling of the mold plate cavities.

Looking at FIG. 6, the mold plate 19 has slid in the forward stroke 21, and the cavities 25 in the front row A have been filled. The mold plate is shown with the row B of cavities being filled from the fill plate fill slot 33. Again, air in the mold plate cavities 25B flows through the breather plate holes 45 and into the breather plate channel 43, slots 54, and grooves 47. The air flows through the mold plate vent holes 29, which remain in communication with the breather plate grooves despite the forward stroke of the mold plate. From the mold plate vent holes, the air flows through the fill plate grooves 41 and to the hopper 5.

Figure 7:
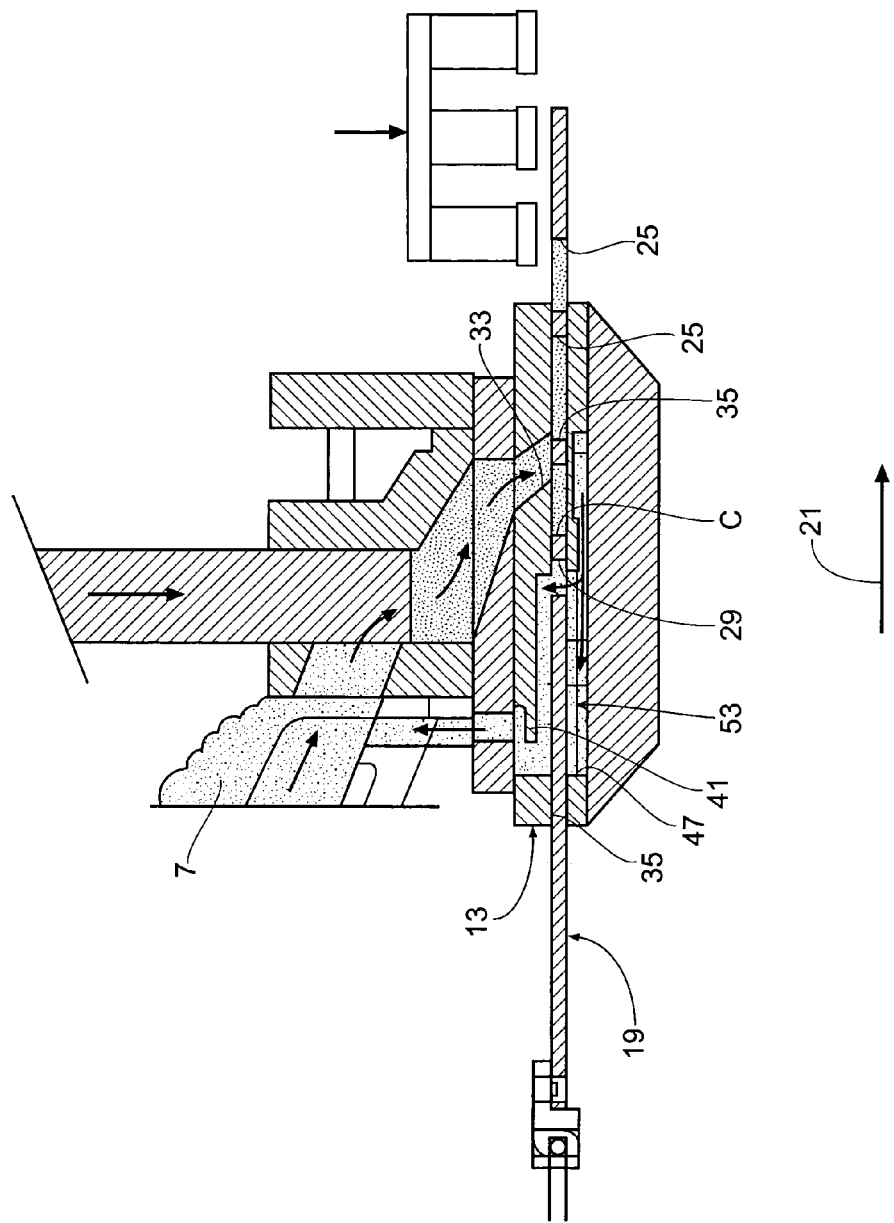
FIG. 7 is a view showing further continued filling of the mold plate cavities.

In FIG. 7, the mold plate 19 has advanced in the forward stroke 21 such that the row C of cavities 25 in communication with the fill plate fill slot 33. Air in the cavities 25C is displaced by the incoming food product 7 into the vent system 53.

It is seen that the mold plate vent holes 29 remain in communication with the associated fill plate grooves 41 and breather plate grooves 47 as long as any air is being displaced from the cavities 25 in any of the rows A, B, or C. As a result, air pressure never builds up in the breather plate grooves. There is thus no lateral force on the mold plate urging it against the fill plate working surface 35. The mold plate is therefore able to reciprocate without friction with the fill plate 13.

In FIG. 8, the mold plate 19 is at its eject position. Knock-out cups 63 advance in the direction of arrow 65 to eject the food material 7 in the form of individual patties 67 from the cavities 25 The mold plate vent holes 29 have lost communication with the breather plate and fill plate grooves 47 and 41, respectively That is of no consequence, however, because no more air is displaced into the breather plate 15 after the cavities 25C have been filled. The mold plate is thus able to reciprocate without friction or vibration in both directions 21 and 23. Wear on the fill plate and mold plate is greatly reduced. The food processing machine can be operated at higher speeds than previously, if desired, to increase production without excessive vibration and chatter.

Figure 11:
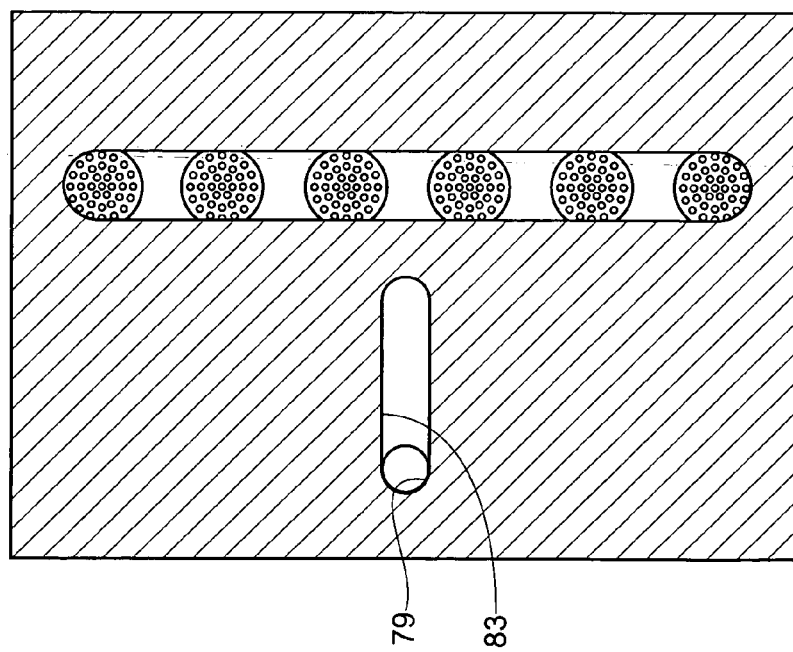
FIG. 11 is a view similar to FIG. 4, but showing an alternative embodiment of the fill plate of the invention.
Figure 9:
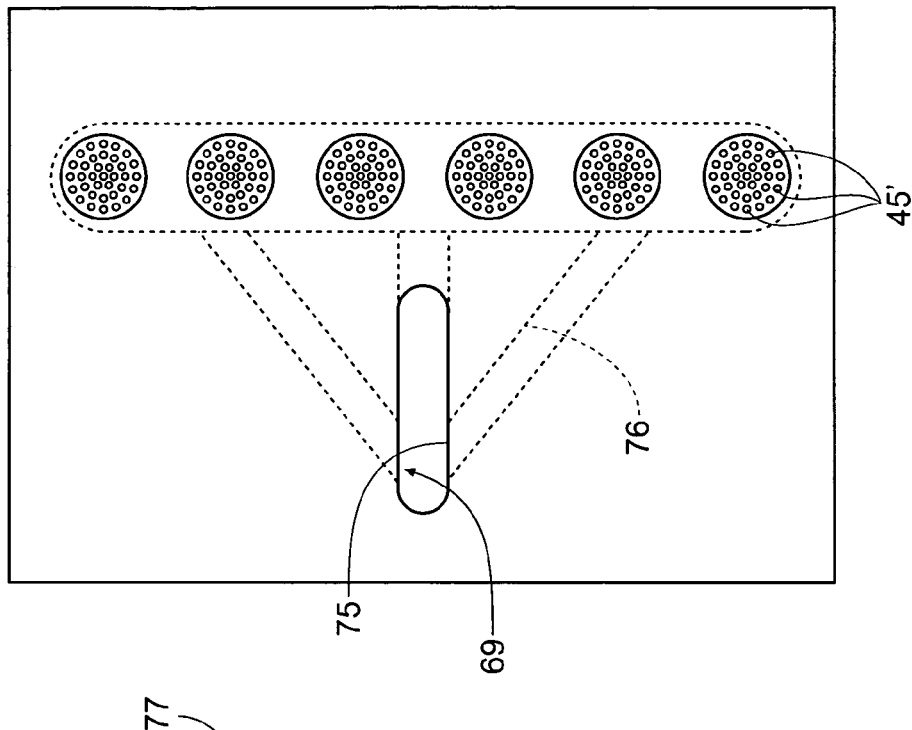
FIG. 9 is a view similar to FIG. 2, but showing an alternative embodiment of the breather plate of the invention.
Figure 10:
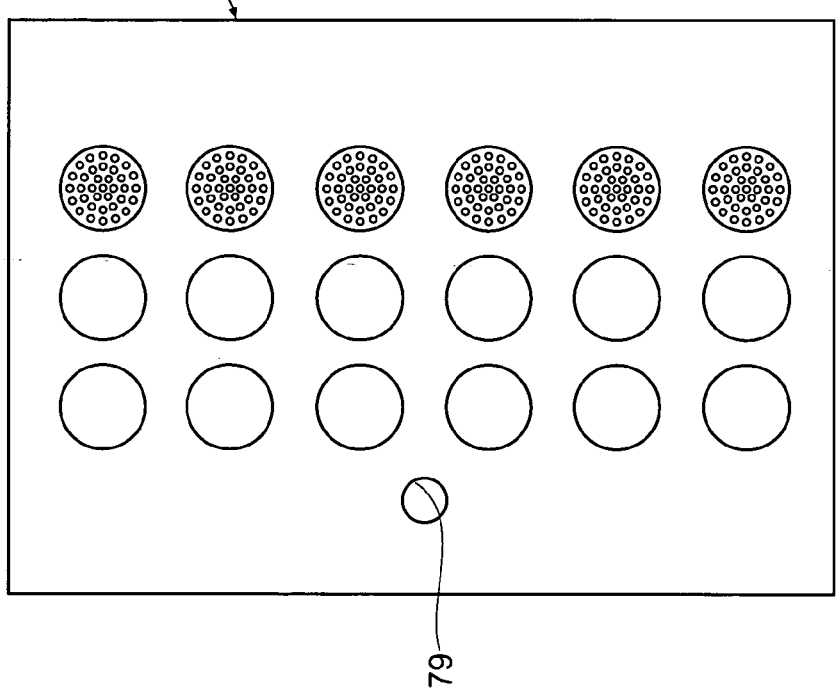
FIG. 10 is a view similar to FIG. 3, but showing an alternative embodiment of the mold plate of the invention.

Turning to FIGS. 9-11, a-modified vent system 69 is depicted. The vent system 69 has a breather plate 71 with patterns of small holes 45'. The breather plate 71 has a single groove 75. The groove 75 connects to the patterns of small holes 45' by one or more slots 76. The mold plate 77 has a single vent hole 79. The fill plate 81 has a single groove 83 in alignment with the mold plate vent hole 79.

In summary, the results and advantages of food processing machinery that forms individual patties 67 from ground meat and similar food material 7 can now be more fully realized. The food processing machine 1 provides both smooth operation and increased wear life of the mold plate and fill plate. This desireable result comes from the combined functions of the vent system. The vent system assures that the air that is displaced from all the mold plate cavities 25 flows freely to the atmosphere, such as by way of the hopper 5. Uninterrupted air flow is achieved because the mold plate vent holes communicate with the fill plate grooves and breather plate grooves whenever food product 7 is filling a row of cavities. Only after all the cavities have completely filled do the vent holes lose communication with the fill plate and breather plate holes.

Thus it is apparent that there has been provided, in accordance with the invention, a vent system for a food processing machine that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of producing individual items of a food product comprising the steps of:
    a. providing a fill plate having a fill plate working surface with at least one longitudinal groove therein and at least one fill slot;
    b. providing a breather plate having a breather plate working surface with at least one longitudinal groove therein, and with patterns of small holes in the working surface that communicate with said at least one breather plate longitudinal groove;
    c. providing a mold plate having at least one row of transverse cavities and at least one vent hole;
    d. sliding the mold plate to a fill position where said at least one row of mold plate cavities is aligned with said at least one fill plate fill slot;
    e. filling said at least one row of mold plate cavities with food product and displacing air in the cavities through the breather plate patterns of small holes into said at least one breather plate longitudinal groove; and
    f. flowing the displaced air from said at least one breather plate longitudinal groove through said at least one mold plate vent hole and said at least one fill plate groove to the atmosphere.

2. The method of claim 1 wherein:
    a. the step of providing a mold plate comprises the step of providing a mold plate with multiple longitudinally spaced transverse rows of cavities;
    b. the step of sliding the mold plate to a fill position comprises the further step of sliding the mold plate to a second position whereat a second row of mold plate cavities is aligned with said at least one fill plate fill slot; and
    c. the step of filling said at least one row of mold plate cavities comprises the step of filling the second row of mold plate cavities with food product and thereby displacing air in the second row of cavities through the breather plate patterns of small holes into said at least one breather plate longitudinal groove.

3. The method of claim 1 wherein:
    a. the step of providing a mold plate comprises the step of providing a mold plate with multiple longitudinally spaced transverse rows of cavities;
    b. the step of sliding the mold plate comprises the step of sequentially communicating the rows of mold plate cavities with said at least one fill plate fill slot and sequentially displacing air in the rows of cavities through the breather plate patterns of small holes into said at least one breather plate longitudinal groove; and
    c. the step of flowing the displaced air comprises the step of flowing the displaced air from the sequentially communicating rows of mold plate cavities through the breather plate patterns of small holes, through said at least one breather plate longitudinal groove, through said at least one mold plate vent hole, and through said at least one fill plate groove to the atmosphere.

4. The method of claim 3 wherein:
    a. the step of providing a fill plate comprises the step of providing a fill plate with multiple longitudinal grooves in the fill plate working surface;
    b. the step of providing a breather plate comprises the step of providing a breather plate with multiple longitudinal grooves in the breather plate working surface; and
    c. the step of providing a mold plate comprises the step of providing a mold plate with multiple vent holes therethrough in communication with the respective fill plate and breather plate grooves.

5. The method of claim 3 wherein:
    a. the step of providing a fill plate comprises the step of providing a fill plate with a single longitudinal groove in the fill plate working surface;
    b. the step of providing a breather, plate comprises the step of providing a breather plate with a single longitudinal groove therein in the breather plate working surface; and c. the step of providing a mold plate comprises the step of providing a mold plate with a single vent hole therethrough in communication with the fill plate groove and the breather plate groove.

6. A method of processing food patties comprising the steps of:
   a. providing a fill plate having a fill plate working surface with at least one longitudinal groove therein, and at least one fill slot;
   b. providing a breather plate having a breather plate working surface with at least one longitudinal groove therein, and with multiple patterns of small holes in communication with said at least one breather plate longitudinal groove;
   c. providing a mold plate with at least first and second longitudinally spaced transverse rows of cavities;
   d. sliding the mold plate between the fill plate and breather plate working surfaces to a first position whereat the first row of cavities is in communication with said at least one fill plate fill slot;
   e. filling the mold plate first row of cavities with food product from said at least one fill plate fill slot; and
   f. displacing air in the mold plate first row of cavities through the breather plate patterns of small holes, through said at least one breather plate longitudinal groove, through said at least one mold plate vent hole, through said at least one fill plate longitudinal groove, and to the atmosphere.

7. The method of claim 6 comprising the further steps of:
   a. sliding the mold plate to a second position whereat the second row of cavities is in communication with said at least one fill plate fill slot;
   b. filling the mold plate second row of cavities with food product from said at least one fill plate fill slot; and
   c. displacing air in the mold plate second row of cavities through the breather plate patterns of small holes, through said at least one breather plate longitudinal groove, through said at least one mold plate vent hole, through said at least one fill plate longitudinal groove, and to the atmosphere.

8. The method of claim 7 wherein:
   a. the step of providing a mold plate comprises the step of providing a mold plate with first, second, and third longitudinally spaced transverse rows of cavities;
   b. the step of sliding the mold plate to a second position comprises the further step of sliding the mold plate to a third position whereat the third row of cavities is in communication with said at least one fill plate fill slot;
   c. the step of filling the mold plate second row of cavities comprises the step of filling the mold plate third row of cavities with food product from said at least one fill plate fill slot; and
   d. the step of displacing air in the mold plate second row of cavities comprises the further step of displacing air in the mold plate third row of cavities through the breather plate patterns of small holes, through said at least one breather plate longitudinal groove, through said at least one mold plate vent hole, through said at least one fill plate longitudinal groove, and to the atmosphere.

9. The method of claim 6 wherein:
   a. the step of providing a fill plate comprises the step of providing a fill plate with multiple longitudinal grooves in the fill plate working surface;
   b. the step of providing a breather plate comprises the step of providing a breather plate with multiple longitudinal grooves in the breather plate working surface in communication with the breather plate patterns of small holes;
   c. the step of providing a mold plate comprises the step of providing a mold plate with multiple vent holes each in communication with respective fill plate and breather plate longitudinal grooves.

10. The method of claim 8 wherein:
   a. the step of providing a fill plate comprises the step of providing a fill plate with multiple longitudinal grooves in the fill plate working surface;
   b. the step of providing a breather plate comprises the step of providing a breather plate with multiple longitudinal grooves in the breather plate working surface in communication with the breather plate patterns of small holes;
   c. the step of providing a mold plate comprises the step of providing a mold plate with multiple vent holes each in communication with respective fill plate and breather plate longitudinal grooves when the mold plate is at the first, second, and third positions thereof.

11. The method of claim 6 wherein:
   a. the step of providing a fill plate comprises the step of providing a fill plate with a single longitudinal groove in the fill plate working surface;
   b. the step of providing a breather plate comprises the step of providing a breather plate having a single longitudinal groove in the breather plate working surface in communication with the breather plate patterns of small holes; and
   c. the step of providing a mold plate comprises the step of providing a mold plate with a single vent hole in communication with the fill plate and breather plate longitudinal grooves.

12. The method of claim 6 wherein the step of displacing air comprises the steps of:
   a. providing the fill plate with at least one opening in communication with said at least one fill plate longitudinal groove; and
   b. providing at least one duct in communication with said at least one fill plate opening and in communication with the atmosphere.

* * * * *